United States Patent
Weinans

(10) Patent No.: US 7,809,406 B2
(45) Date of Patent: Oct. 5, 2010

(54) CONTINUED TRANSFER OR STREAMING OF A DATA FILE AFTER LOSS OF A LOCAL CONNECTION

(75) Inventor: Erwin Weinans, Klijndjik (NL)

(73) Assignee: Sony Ericsson Mobile Communications AB, Lund (SE)

( * ) Notice: Subject to any disclaimer, the term of this patent is extended or adjusted under 35 U.S.C. 154(b) by 1054 days.

(21) Appl. No.: 11/532,264

(22) Filed: Sep. 15, 2006

(65) Prior Publication Data

US 2008/0070612 A1 Mar. 20, 2008

(51) Int. Cl.
*H04M 1/00* (2006.01)

(52) U.S. Cl. .................. 455/566; 455/412.2; 455/556; 455/41.2; 455/567; 715/747; 370/315

(58) Field of Classification Search ............ 455/41.2, 455/556, 567, 11.1, 552, 566, 412.2, 158.4; 370/315, 342; 714/747, 733; 715/747, 733
See application file for complete search history.

(56) References Cited

U.S. PATENT DOCUMENTS

| | | | |
|---|---|---|---|
| 7,016,707 B2 * | 3/2006 | Fujisawa et al. | 455/567 |
| 7,046,961 B2 * | 5/2006 | Park | 455/41.2 |
| 7,116,438 B2 * | 10/2006 | Maeoka et al. | 358/1.15 |
| 7,433,546 B2 * | 10/2008 | Marriott et al. | 382/305 |
| 2002/0013784 A1 * | 1/2002 | Swanson | 707/104.1 |
| 2002/0111138 A1 * | 8/2002 | Park | 455/41 |
| 2002/0115478 A1 * | 8/2002 | Fujisawa et al. | 455/567 |
| 2003/0055735 A1 * | 3/2003 | Cameron et al. | 705/26 |
| 2004/0160623 A1 * | 8/2004 | Strittmatter et al. | 358/1.15 |
| 2005/0015483 A1 * | 1/2005 | Carter et al. | 709/224 |
| 2005/0062726 A1 * | 3/2005 | Marsden et al. | 345/173 |
| 2005/0202844 A1 * | 9/2005 | Jabri et al. | 455/556.1 |
| 2009/0172560 A1 * | 7/2009 | Cole et al. | 715/744 |

FOREIGN PATENT DOCUMENTS

| | | |
|---|---|---|
| EP | 1 109 139 A2 | 6/2001 |
| EP | 1 562 354 A1 | 10/2005 |
| WO | WO 01/99392 A1 | 12/2001 |
| WO | WO 03/103177 A1 | 12/2003 |
| WO | WO 2006/043977 A1 | 4/2006 |

OTHER PUBLICATIONS

International Search Report issued in corresponding international application No. PCT/EP2007/052425 dated Jul. 19, 2007, 4 pages.

* cited by examiner

*Primary Examiner*—Minh D Dao
(74) *Attorney, Agent, or Firm*—Harrity & Harrity, LLP

(57) ABSTRACT

A central portable communication device can display further information related to first information received in an associated local portable communication. The associated local portable communication device may receive and present the first information, and may send, in dependence of a selection made by a user, a request for displaying the further information in the central portable communication device via a local link. The central portable communication device may receive the request, automatically retrieve further information based on the request, and display the additional information on a display.

11 Claims, 5 Drawing Sheets

CONTINUED TRANSFER OR STREAMING OF A DATA FILE AFTER LOSS OF A LOCAL CONNECTION

TECHNICAL FIELD OF THE INVENTION

The present invention relates to the field of central portable communication devices, such as cellular phones, and associated local portable communications devices, such as accessories to phones. More particularly, the present invention relates to displaying information related to a local portable communication device at the central portable communication device.

DESCRIPTION OF RELATED ART

Portable communication devices, such as cellular phones can perform a number of applications, such as making telephone calls, sending and receiving messages, browsing the Internet, receive different types of feeds like RSS feeds, etc. They are also often provided with local wireless communication abilities, such as Bluetooth™.

With the rise of such local wireless communication abilities there are also a number of different associated local devices that have evolved that communicate locally with a phone, such as head sets, portable hands-free units, music players and even watches. These devices, called accessories, often have a very limited size. These accessories may be provided with displays and it may be possible to transfer information to the accessory from the portable communication device for display. The transfer is normally made while the phone is in a standby mode, i.e. none of the above mentioned applications are active. However, the information transferred is often very limited because of the small size of the accessory and the consequently small display size. If a user of the accessory would then want to look at some further information not transferred, he or she would normally have to pick up the phone, start the application with which the displayed information was associated and there make a number of entries in order to locate the desired additional information.

This is quite burdensome for the user. There is therefore a need of simplifying the locating of further information in a portable communication device.

SUMMARY OF THE INVENTION

The present invention is directed towards simplifying the locating of further information in a central portable communication device associated with first information presented in a local associated portable communication device. The further information can be displayed with a minimum of user interaction.

According to a first aspect, a method of allows a central portable communication device having computing ability to display further information related to first information received in a local portable communication device associated with the central portable communication device comprising, in the associated communication device. The method includes receiving the first information, presenting the first information, and sending, based on a selection made by a user of the local portable communication device, a request for displaying said further information at the central portable communication device via a local link to the central portable communication device, the central portable communication device automatically retrieving and displaying said further information.

A second aspect includes the features of the first aspect, wherein receiving the first information comprises receiving the first information from the central portable communication device via the local link.

A third aspect includes the features of the second aspect, wherein the request comprises a trigger that allows the central portable communication device to automatically retrieve further information associated with the latest received first information.

A fourth aspect of the present invention includes the features of the first aspect, wherein the request comprises an identifier for retrieving the further information, which is used by the central portable communication device for automatically retrieving the further information.

A fifth aspect of the present invention includes the features of the fourth aspect, wherein receiving the first information includes receiving the first information from the central portable communication device via a local link.

A sixth aspect of the present invention includes the features of the fourth aspect, wherein the receiving the first information comprises receiving the first information from another source than the central portable communication device.

According to a seventh aspect, a local portable communication device associated with a central portable communication device includes at least one information presenting unit, at least one user input unit, a local wireless communication unit, and a control unit configured to receive first information, present said first information on said information presenting unit, and send, based on a selection made by a user of the local communication device via said user input unit, a request for displaying information in the local portable communication device at the central portable communication device via said local wireless communication unit, in order for the central portable communication device to automatically retrieve and display said information.

An eighth aspect includes the features of the seventh aspect, wherein the control unit is configured to receive the first information from the central portable communication device via the local wireless communication unit.

A ninth aspect includes the features of the eighth aspect, wherein the request comprises a trigger that allows the central portable communication device to automatically retrieve further information associated with the latest received first information.

A tenth aspect includes the features of the seventh aspect, wherein the request comprises an identifier for retrieving the further information, which is used by the central portable communication device for automatically retrieving the further information.

An eleventh aspect includes the features of the tenth aspect, wherein said control unit is configured to receive the first information from the central portable communication device via the local wireless communication unit.

A twelfth aspect of the present invention includes the features of the tenth aspect, further comprising a wireless signal receiving unit, wherein said control unit is configured to receive the first information from another source than the central portable communication device via the wireless signal receiving unit.

A thirteenth aspect is directed towards a local portable communication device associated with a central portable communication. The local portable communication device includes means for receiving first information, means for presenting said first information, and means for sending, based on a selection made by a user of the local communication device, a request for displaying second information in the portable communication device via a local link to the central portable communication device, in order for the central portable communication device to automatically retrieve and display said second information.

According to a fourteenth a computer program product includes computer program code to receive first information in a local portable communication device associated with a central portable communication device, computer program code to present the first information, and computer program code to send, based on of a selection made by a user of the local communication device, a request for displaying further information in the portable communication device via a local link to the portable communication device, in order for the central portable communication device to automatically retrieve and display said further information.

According to a fifteenth aspect this is achieved by a method of displaying, in a central portable communication device having computing ability, further information related to first information received in a local portable communication device that is associated with the central portable communication device. The method includes receiving, from the associated local portable communication device and in dependence of a selection made by a user of the local portable communication device, a request for displaying further information via a local link, and automatically retrieving further information based on the received request, and displaying the further information.

A sixteenth aspect includes the features of the fifteenth aspect, wherein the step of automatically retrieving further information comprises the further step of selecting an application associated with the further information, starting the application, and locating the further information via the started application.

A seventeenth aspect includes the features of the fifteenth aspect, further comprising the step of sending the first information to the local portable communication device via a local link.

An eighteenth aspect includes the features of the seventeenth aspect, wherein the step of sending comprises sending the first information when in a standby mode.

A nineteenth aspect includes the features of the seventeenth aspect, wherein the request comprises a trigger and the step of automatically retrieving further information comprises automatically retrieving further information associated with the latest sent first information.

A twentieth aspect includes the features of the fifteenth aspect, wherein the request comprises an identifier associated with the further information and the step of automatically retrieving further information comprises automatically retrieving further information associated with the identifier.

According to a twenty-first aspect, a central portable communication device has computing ability and is associated with a local portable communication device. The central portable communication device includes a local wireless communicating unit, a display, and a control unit configured to receive, from the associated local portable communication device and in dependence of a selection made by a user of the local portable communication device, a request for displaying further information via said local wireless communicating unit, and automatically retrieve further information based on the received request, and display the additional information on said display.

A twenty-second aspect includes the features of the twenty-first aspect, further comprising at least one application handling unit, wherein the control unit when automatically retrieving further information is further configured to select an application associated with the further information, starting the application via a corresponding application handling unit, and locate the further information via the started application.

A twenty-third aspect of the present invention includes the features of the twenty-first aspect, wherein the control unit is further configured to send the first information to the local portable communication device via the local wireless communicating unit.

A twenty-fourth aspect includes the features of the twenty-third aspect, wherein the control unit is configured to send the first information when the device is in a standby mode.

A twenty-fifth aspect includes the features of the twenty-third aspect, wherein the request comprises a trigger and said control unit when automatically retrieving further information is configured to automatically retrieve further information associated with the latest sent first information A twenty-sixth aspect includes the features of the twenty-first aspect, wherein the request comprises an identifier associated with the further information and said control unit when automatically retrieving further information is configured to automatically retrieve further information associated with the identifier.

A twenty-seventh aspect includes the features of the twenty-first aspect, wherein the portable communication device is a cellular phone.

A twenty-eight aspect is directed to a central portable communication device having computing ability and with which a local portable communication device is associated. The central portable communication device includes means for receiving, from the associated local portable communication device and in dependence of a selection made by a user of the local communication device, a request for displaying further information via a local link, means for automatically retrieving the further information based on the received request, and means for displaying the further information.

According to a twenty-ninth aspect is achieved by a computer program product comprising computer program code to receive from a local portable communication device and in dependence of a selection made by a user of the local communication device, a request for displaying further information via a local link, computer program code to automatically retrieve further information based on the received request, and computer program code to display the further information at a central portable communication device that is associated with the local portable communication device.

The aspects recited above may allow a user to easily obtain further information associated with first information presented by his local portable communication device and display the further information on his central portable communication device. This is furthermore done automatically in the central portable communication device with a minimum of user interaction. User-friendliness of both devices may therefore be improved.

It should be emphasized that the term "comprises/comprising" when used in this specification is taken to specify the presence of stated features, steps or components, but does not preclude the presence or addition of one or more other features, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
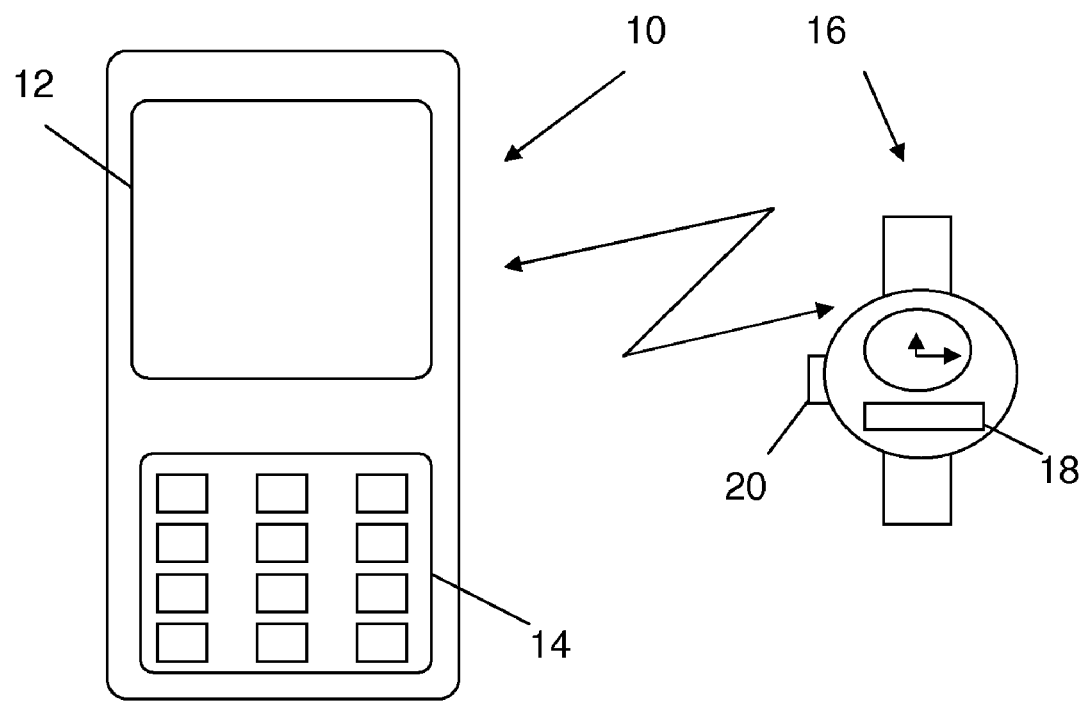
FIG. 1 shows a central portable communication device in the form of a cellular phone communicating with a local portable communication device in the form of a specialised wrist watch via a local wireless connection.

As shown in FIG. 1, a central portable communication device 10 communicates with an associated local portable communication device 16 in the form of a specialised wrist watch. The communication is performed via a direct local wireless link. The central portable communication device 10 may be a cellular phone 10 having a display 12 and a user input unit in the form of a keypad 14 including a number of keys. The keypad 14 is used for entering information such as selecting of functions and responding to prompts and the display 12 is used for displaying functions and prompts to a user of the phone as well as for presenting information associated with various applications in the phone. A cellular phone is just one example of a central portable communication device in which the invention can be implemented. It may for instance also be a PDA (personal digital assistant), a palm top computer, or a lap top computer. The wrist watch may be functionally separate from different time keeping units provided with a display 18 and a user input unit 20 in the form of a button. A wrist watch is furthermore just an example of an accessory that may be used together with the central portable communication device. It may, for instance, be a portable hands-free device, a headset or even a portable music player.

Figure 2:
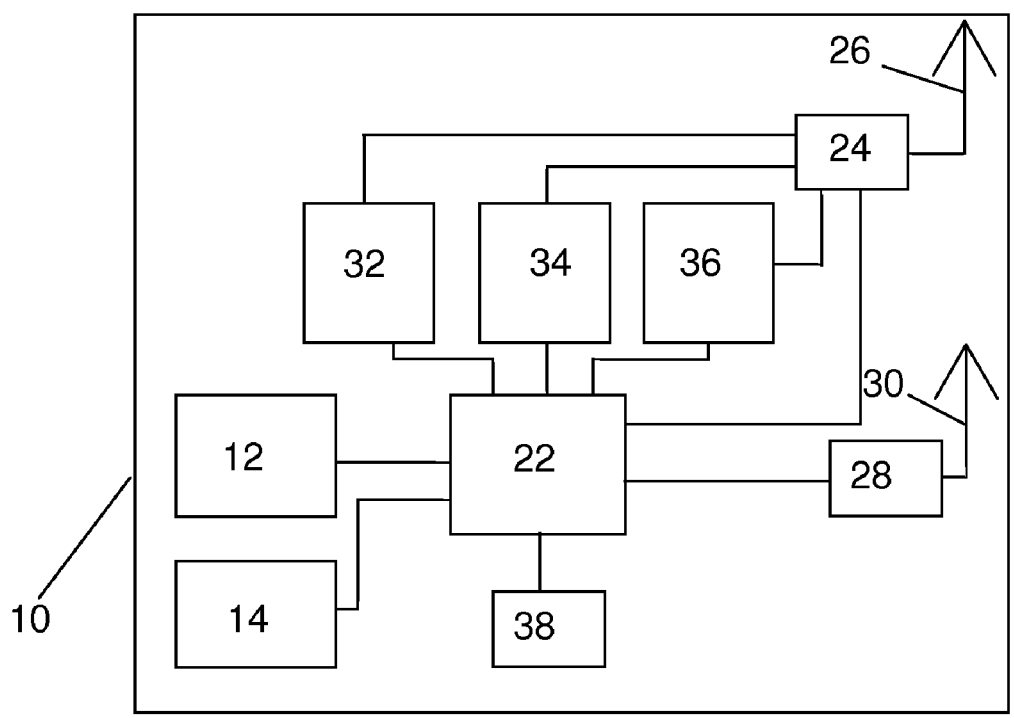
FIG. 2 shows a block schematic of the relevant parts of the cellular phone shown in FIG. 1.

FIG. 2 shows a block schematic of a part of the interior of the cellular phone 10. The phone 10 includes a phone control unit 22 connected to a first wide area network communicating unit 24, to a second local wireless communication unit 28, which may be a Bluetooth™ communication unit (or other short range communication unit) and to number of application handling units 32, 34, 36 and 38, where a first application handling unit is a browsing application handling unit 32, a second application handling unit 34 is a call application handling unit, a third application handling unit 36 is a messaging handling unit and a fourth application handling unit 38 is a contacts handling application unit. Phone control unit 22 may also be connected to the keypad 14 and to the display 12. The first, second and third application handling units 32, 34 and 36 are also connected to the first wide area network communicating unit 24. The first communication unit 24 is connected to a first antenna 26 for communication with a wide area network and the second communication unit 28 is connected to a second antenna 30 for local communication. It should be realised that there may be more or fewer application handling units than the ones shown. Communication device 10 may, for instance, include a calendar. These further application handling units are connected to the first communication unit if they need to communicate over a wide area network.

Figure 3:
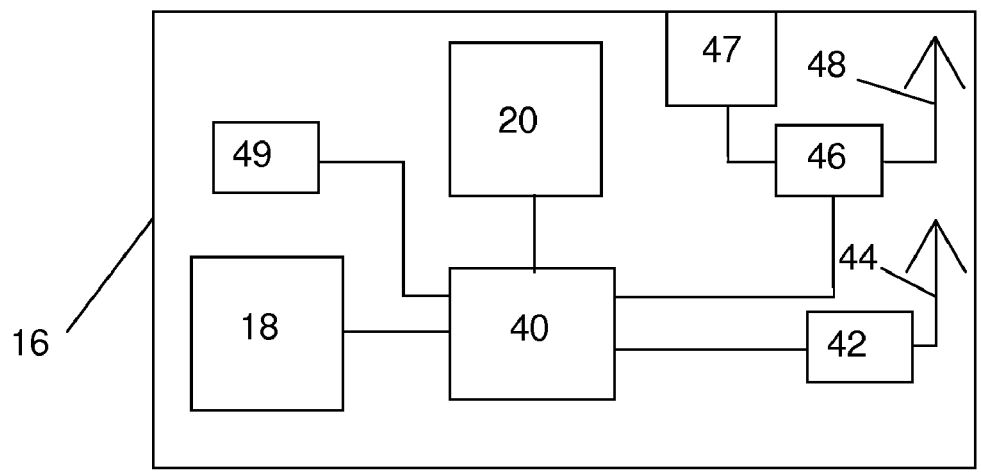
FIG. 3 shows a block schematic of the relevant parts of the wrist watch show in FIG. 1.

FIG. 3 shows a block schematic of a part of the interior of wrist watch 16. Watch 16 includes an accessory control unit 40 connected to a local wireless communication unit 42, which may be a Bluetooth™ communication unit, to a wireless signal receiving unit 46, to the display 18, the button 20, and to an identifier store 49. The communication unit 42 is connected to a first antenna 44 for local communication while the signal receiving unit 46 is connected to a speaker 47 and to a second antenna 48 for receiving broadcasting signals such as radio or TV signals. The block schematic includes all units that are provided for the various described embodiments. It should be realised that they do not all need to be present in a device of the present invention. The wireless signal receiving unit 46 and associated antenna 48 may, for instance, be omitted in some embodiments, as may the identifier store 49, display 18, and speaker 47.

Figure 4:
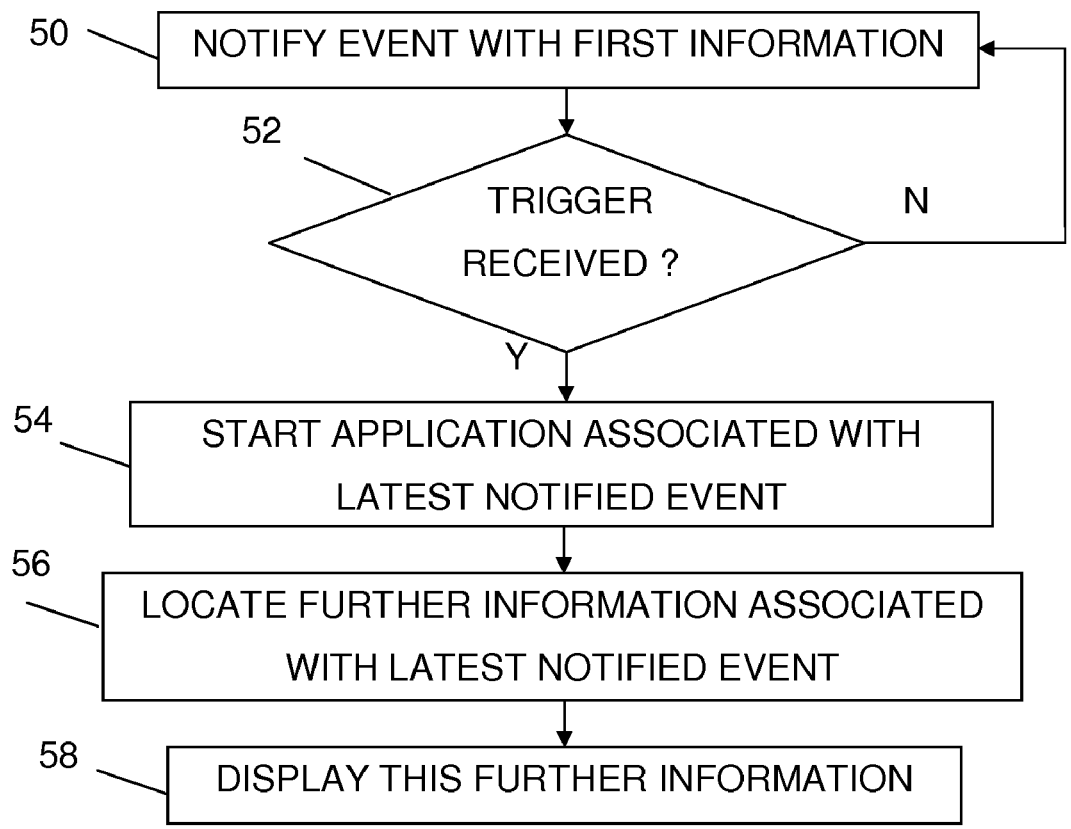
FIG. 4 shows a flow chart of a method of displaying further information according to a first embodiment.
Figure 5:
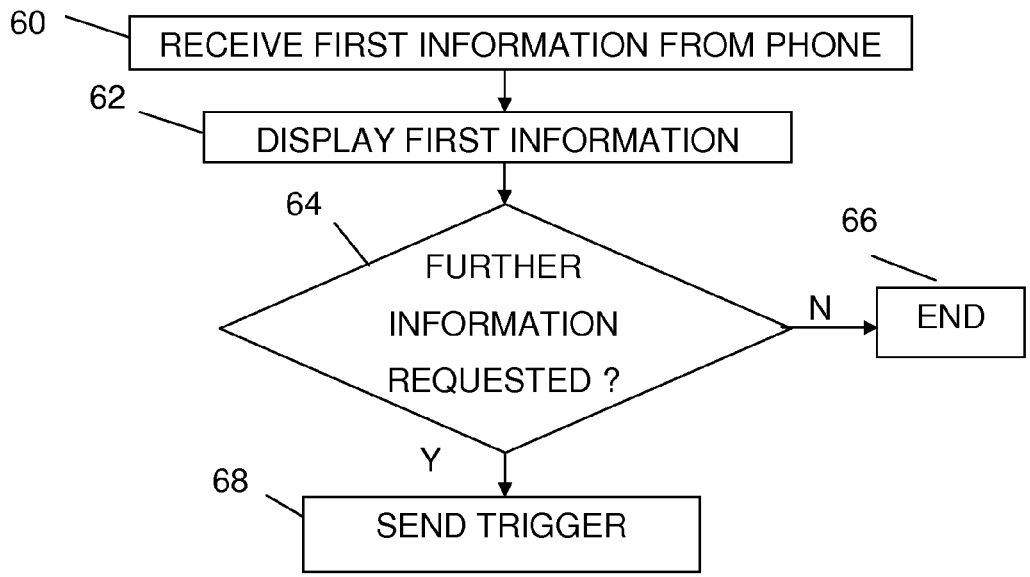
FIG. 5 shows a flow chart of a method of enabling display of further information according to the first embodiment.

The functioning of the present invention according to a first embodiment will now be described in relation to the previously described FIGS. 1-3 together with FIG. 4, which shows a flow chart of a number of operations for displaying further information, and FIG. 5, which shows a flow chart of operations for enabling displaying of further information provided in the wrist watch.

According to the first embodiment the phone 10 and wrist watch 16 are first paired. Through this pairing, the local wireless communication units 28 and 42 of the phone 10 and wrist watch 16 identify each other and can after that communicate with each other. Pairing is known and will not be described further herein. After this pairing has been made, the user of the phone may activate a certain event notification function in which the phone 10 may transfer information to the wrist watch 16 to be displayed on the display 18 of that device.

According to the first embodiment, the phone transfers notifications of events which may include such information as information of missed calls, received messages, like e-mails, SMS or MMS messages, and scheduled meetings and appointments. In addition to this, it may also provide status information of the phone like remaining battery capacity.

The method according to the first embodiment may thus start with the phone control unit 22 detecting an event associated with a certain application. This is normally done when the phone is in a standby mode, i.e. there are no applications started and running. As an example, the phone control unit 22 is notified by the messaging handling unit 36 that a message has been received. A message is typically received via the communication unit 24 and antenna 26. The phone control unit 22 then notifies the event by sending first information to the wrist watch 16 using the communication unit 42 and antenna 44, act 50. This first information may include, apart from an indication that a message has been received, also a short summary of the message perhaps including an identity of the sender. This first information may thus be sent to the wrist watch 16 over a direct local wireless link. Thereafter the phone control unit 22 checks if a request for further information in the form of a trigger has been received from the wrist watch, act 52, and if it has not it goes on and notifies further events, act 50.

The event notification is then received by the communication unit 42 of the wrist watch 16 via antenna 44 and forwarded to the accessory control unit 40. Thus, the accessory control unit receives this first information from the phone 10, act 60, and then displays it on the display 18, act 62. Thereafter the accessory control unit 40 awaits user input via the button 20. By pressing the button 20, the user requests further information concerning the notified event. If no such further information is requested, act 64, the method in the wrist watch 16 is ended for this notification, act 66, but will be started anew when another event is notified. If further information is requested by the user pressing the button, act 64, the accessory control unit 40 orders the communication unit 42 to send a request for further information through sending a trigger signal to the phone 10 via the antenna 44, act 68.

Referring back to FIG. 4, this trigger, which may be, for example, a pulse, is then received by the communication unit 28 via the antenna 30 and is forwarded to the phone control unit 22, which in this way receives the trigger, act 52. The phone control unit 22 then investigates what event it last notified the wrist watch 16 of and then starts the corresponding application associated with this event, act 54. In the present example, it starts the messaging handling application 36. Thereafter the phone control unit 22 locates further information associated with this latest notified event, act 56, which in this embodiment it does through locating the actual message that was notified. It finally displays the further information on the phone display 12, act 58. In this example, the further information is the remainder or at least a part of the remainder of the message apart from the summary. In the context of messages it may of course instead display the whole of the message including the summary. The method then continues in the above described way for each occurring event The user may thereafter, of course, deactivate the event notification function.

Advantageously, as described herein, a user may easily view information associated with notified events normally provided on a limited size accessory display and instead view the information on his phone. This can be done automatically in the phone without the user having to navigate through the menu system of the phone for locating the application, starting the application, locating the cause of the event via this application and then selecting to display the further information. Thus, the invention improves the user-friendliness of both the phone and the wrist watch. The use of a trigger also reduces the complexity of the wrist watch, which makes it easier to keep it small and economical.

In case the event for which further information is desired is a missed phone call, the phone control unit 22 may activate the contacts application handling unit 38 instead of the call application handling unit 34 and locate the contact or person that tried to make the call. It may then present this further information on the phone display 12. In this way the user may directly find out who tried to call and may then also be provided with a picture of this person. If a calendar is provided, further details of a scheduled meeting or a scheduled appointment may be provided in the same way.

Figure 6:
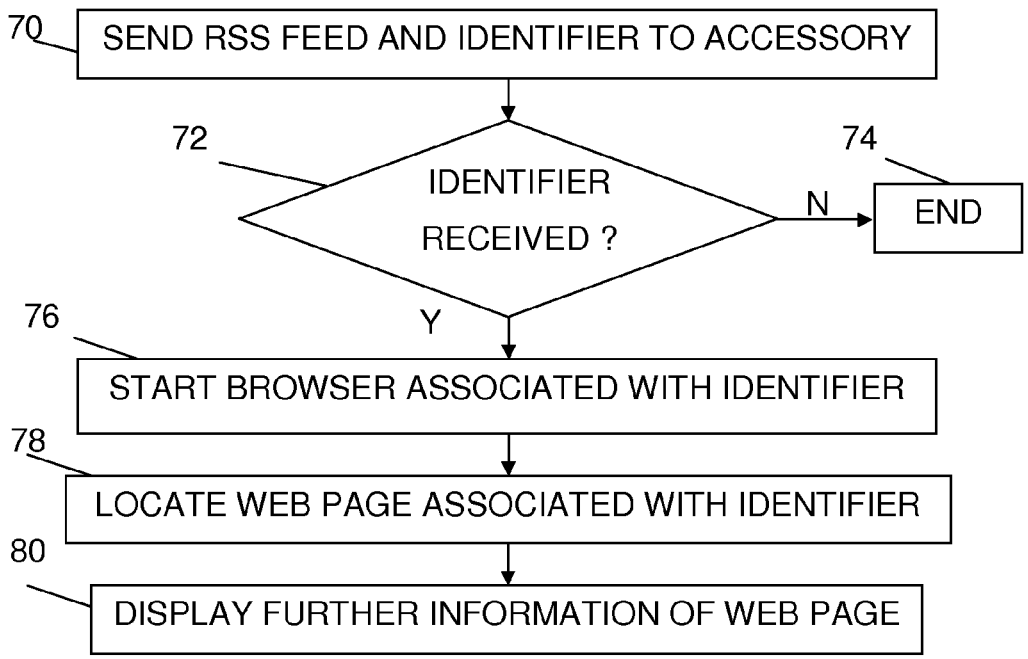
FIG. 6 shows a flow chart of a method of displaying further information according to a second embodiment.

Now a second embodiment will be described with reference to FIGS. 1-3, as well as to FIG. 6, which is a flow chart of operations performed in a method of displaying further information provided in the phone, and FIG. 7, which shows a flow chart of operations performed in a method of enabling displaying further information provided in the wrist watch.

In the second embodiment the phone control unit 22 may receive an RSS feed from the wide area network communication unit 24. It may provide an identifier associated with this RSS feed that identifies the application handling unit and also where the further information is provided. In this case the further information may be provided on a web page and therefore the identifier may be a URL. It is however also possible that the identifier is an indirect identifier that points at the URL. For this reason there may be an identifier store provided in the phone 10 and in which the phone control unit 22 may look and find out which application to use and where the further information is to be found for some first information displayed on the wrist watch 16. In the following, the identifier will be assumed to be a URL.

The method may start with the phone control unit 22 forwarding the RSS feed to the wrist watch 16 and then also sending the identifier via the local link, act 70. It thereafter awaits the reception of an identifier, act 72, and if none is received from the wrist watch, act 72, the method is ended, act 74.

Figure 7:
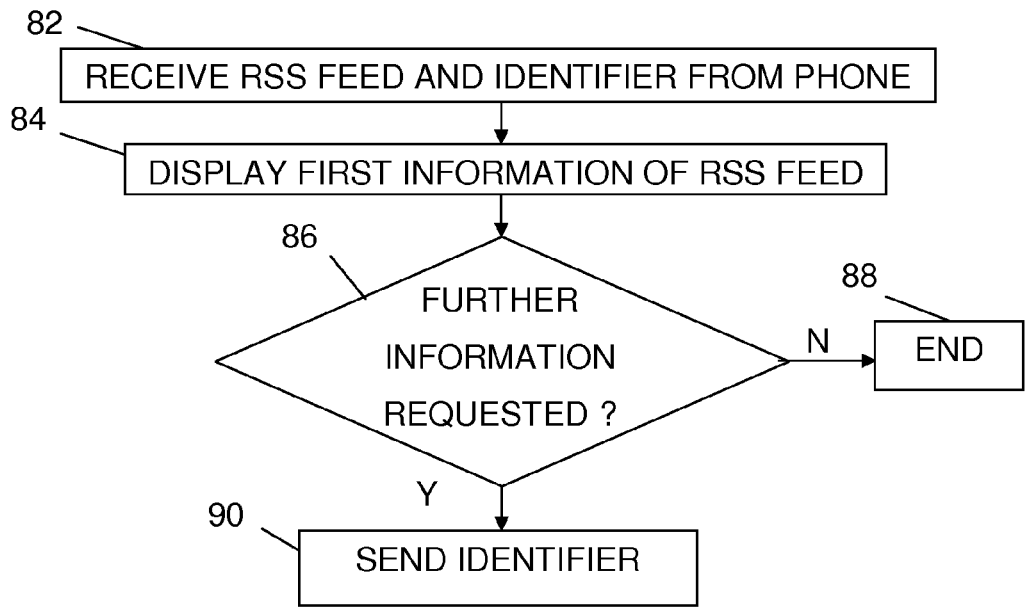
FIG. 7 shows a flow chart of a method of enabling displaying further information according to the second embodiment

The accessory control unit 40 receives the RSS feed and identifier via the communication unit 42, act 82 (FIG. 7). The accessory control unit 40 then displays the first information of the RSS feed on the wrist watch display 18, act 84, and then awaits a user selection of further information via the button 20. If no further information is selected, act 86, the method is ended, act 88, while if further information is selected, act 86, the accessory control unit 40 sends a request for further information through sending the identifier of the RSS feed to the phone 10 via communication unit 42, act 90.

The phone control unit, when it receives this identifier via the communication unit 28, act 72, investigates the identifier, sees that it is a URL and therefore starts a browser through activating the browsing handling application unit 32, act 76. Thereby a web browser is started. It then provides the browsing handling application unit with the URL so that further information associated with the first information may be located. This is done through the URL locating a web page where the further information is provided, act 78. Finally the further information of the web page is displayed, act 80.

In this way a user may receive a RSS feed, which may for instance provide stock market information, like information about a certain stock or weather forecast information in a compact form. If the user then wants to obtain further information, for instance regarding the whole stock market, he may then get further information by directly obtaining a web page on his phone. This is furthermore done without him having to perform a number of cumbersome steps on the phone. The phone fetches and displays the further information automatically without the user having to operate it.

The principles of using an identifier described here may also be used in the first embodiment, where an identifier is set for each notified event. When this is done it may be possible to store several such notifiers both in the phone and in the wrist watch. The user may then obtain further information about an earlier event than the last one through locating and returning the appropriate identifier.

The principles of using a trigger may also be used for the second embodiment in that a single trigger is used for providing the further information. The phone control unit then fetches a stored URL associated with an active or latest feed when a trigger is received and uses this for accessing a web page.

Figure 8:
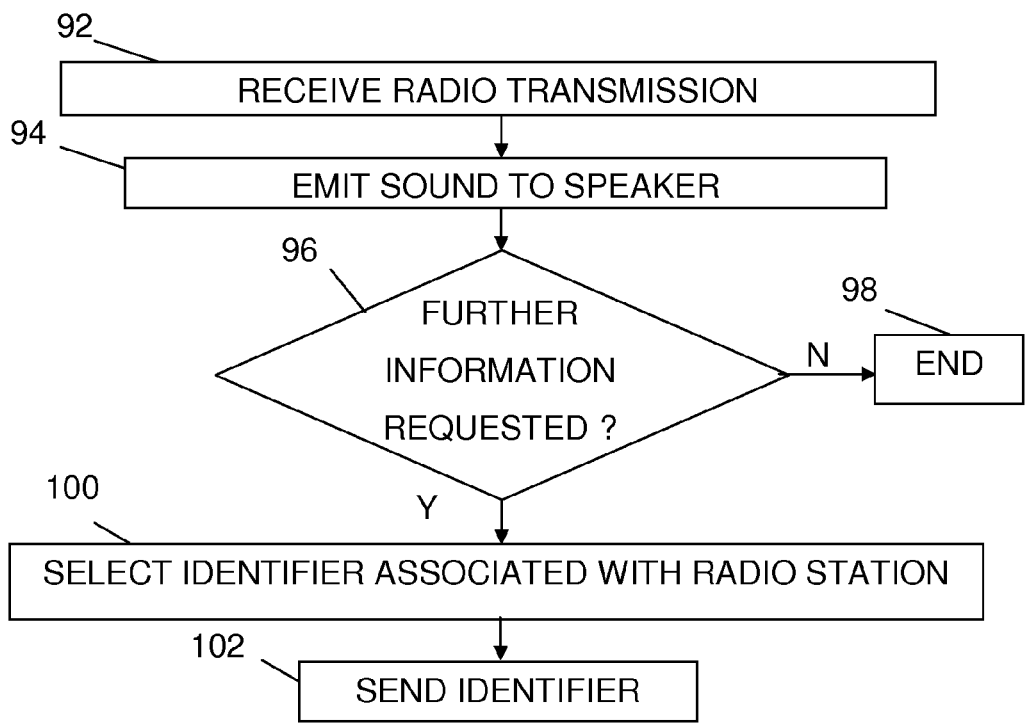
FIG. 8 shows a flow chart of a method of enabling displaying further information according to a third embodiment.
Figure 9:
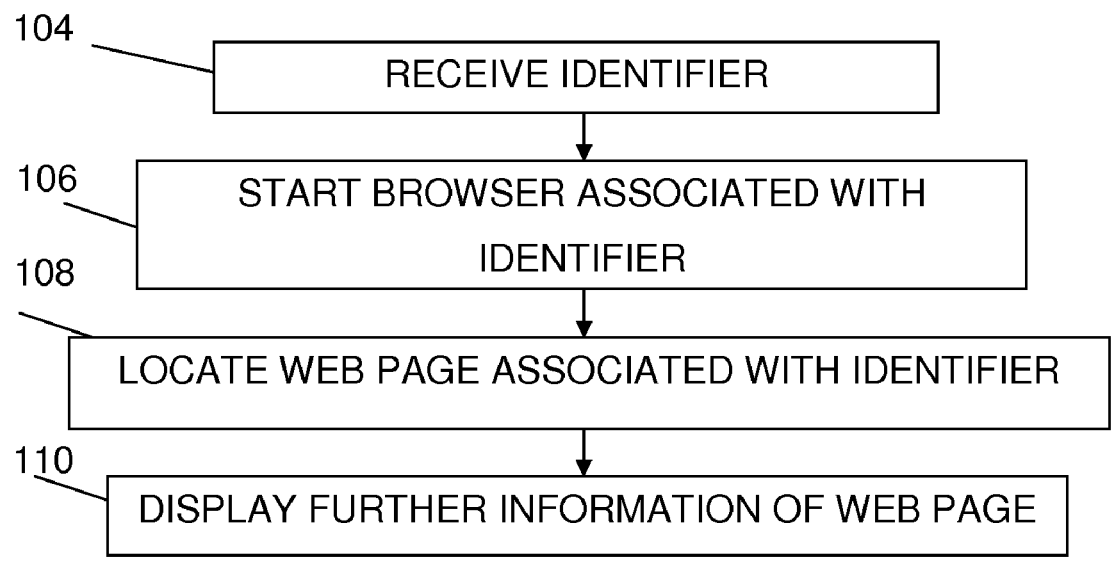
FIG. 9 shows a flow chart of a method of displaying further information according to the third embodiment.

A third embodiment will next be described with reference being made to FIGS. 1-3, as well as to FIG. 8, which shows a flow chart of a number of operations performed in a method of enabling displaying further information provided in the wrist watch, and FIG. 9 which shows a flow chart of a number of operations performed in a method of displaying further information provided in the phone.

Wrist watch 16 may be provided with a wireless signal receiving unit 46 for receiving broadcast radio or television signals. In this situation, the wrist watch may use speaker 47 for emitting sound of the radio. In this case, wrist watch 16 may furthermore be provided with several buttons (not shown), each associated with a corresponding radio or TV channel. Each such button is furthermore associated with an identifier of the radio or TV channel, which may be a URL or a pointer to a URL of a web page of the radio channel. Also the phone 10 may, in this case, have the URLs stored in a suitable identity store and if the identifier is a pointer also the pointer to the URL in order to be able to locate the URL.

The method will now be exemplified with the use of radio, for instance FM radio. The method starts with wrist watch 16 receiving a radio transmission, act 92, via antenna 46 and receiving unit 46. The sound of the radio transmission may then be output through speaker 47, act 94. The accessory control unit 40 then awaits the user to request further information via a button 20 of the wrist watch 16. If the user does not request further information, act 96, the method is ended, act 98, while if the user does, act 96, the identifier associated with the radio station is selected and fetched from identity store 49, act 100, whereupon the identifier is sent to the phone, act 102.

When the phone 10 receives this identifier, act 104, it starts the browser 32, act 106, locates the web page using this browser, act 108, and displays the further information of the web page on display 12, act 110. These operations are performed in the same way as in the second embodiment and the details will thus not be repeated here.

According to a third embodiment a user may directly and effortlessly receive further information in his phone about broadcast radio received in his accessory. This is furthermore done automatically in the phone without the user having to operate it.

The control unit and application handling units in the phone as implemented according to the present invention may be preferably provided in the form of one or more processors with corresponding memories containing the program code for performing the functions of these units. The communication units are provided as separate hardware modules, for instance in the form of ASIC circuits. They may however be combined in the same module. The different hardware units of the phone may furthermore be connected using a data bus.

In the wrist watch, the accessory control unit may also be provided in the same way. However it is normally preferred to have a much simpler structure, for instance, using a number of hard-wired logical circuits. The identity store is also an ordinary memory module such as a RAM, ROM or a flash memory. The local wireless communication unit may here also be provided in the form of an ASIC circuit.

Figure 10:
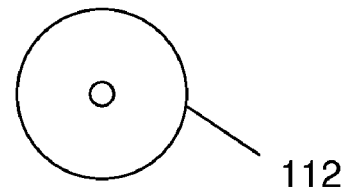
FIG. 10 shows a CD ROM disc on which program code for executing a method according to the invention is provided.

The program code mentioned above can also be provided on one or more computer program products such as a CD ROM disc 112 as depicted in FIG. 10, which will perform the invention when loaded into a phone having suitable processing capabilities. Naturally other types of products can be provided for this, like for instance a removable memory such as a memory stick. The computer program product can also be provided as software, which is downloaded remotely from a server either outside or inside the wide area network or be downloaded via a computer like a PC to which the phone is temporarily connected. From the phone, suitable software may also be sent to the wrist watch via the local link.

There are a number of further variations that can be made to the concepts discussed in addition to those already mentioned. It is possible to use communication techniques other than Bluetooth. It is for instance possible to use IR communication instead. It is furthermore not necessary that the central portable communication device communicates via a wide area network. It may for instance communicate with a local WLAN, which may in turn be connected to a network such as the Internet. The different described embodiments may furthermore be combined either partially or all together at the same time.

Although the present invention has been described in connection with specific embodiments, it is not intended to be limited to the specific form set forth herein. Rather, the scope of the present invention is limited only by the accompanying claims.

The invention claimed is:

1. A method of displaying, in a central portable communication device having computing ability, further information related to first information received in a local portable communication device that is associated with the central portable communication device, the method comprising:
   receiving, from the associated local portable communication device and in dependence of a selection made by a user of the local portable communication device, a request for displaying further information via a local link, wherein the request comprises a trigger,
   automatically retrieving further information based on the received request, wherein automatically retrieving further information comprises automatically retrieving further information associated with a latest sent first information,
   displaying the further information, and
   sending the first information to the local portable communication device via a local link.

2. The method according to claim 1, wherein the automatically retrieving further information additionally comprises:
   selecting an application associated with the further information,
   starting the application, and
   locating the further information via the started application.

3. The method according to claim 1, wherein sending the first information further comprises:
   sending the first information when in a standby mode.

4. The method according to claim 1, wherein the request comprises an identifier associated with the further information and automatically retrieving further information comprises automatically retrieving further information associated with the identifier.

5. A central portable communication device having computing ability and with which a local portable communication device is associated, the central portable communication device comprising:
   a local wireless communicating unit,
   a display, and
   a control unit configured to:
      receive, from the associated local portable communication device and in dependence of a selection made by a user of the local portable communication device, a request for displaying further information via said local wireless communicating unit, wherein the request comprises a trigger,
      automatically retrieve further information based on the received request, where said control unit, when automatically retrieving further information, is configured to automatically retrieve further information associated with a latest sent first information,
      display the additional information on said display, and
      send the first information to the local portable communication device via the local wireless communicating unit.

6. The portable communication device according to claim 5, further comprising at least one application handling unit, wherein the control unit when automatically retrieving further information is further configured to select an application associated with the further information, starting the application via a corresponding application handling unit and locate the further information via the started application.

7. The portable communication device according to claim 5, wherein the control unit is configured to send the first information when the device is in a standby mode.

8. The portable communication device according to claim 5, wherein the request comprises an identifier associated with the further information and said control unit when automatically retrieving further information is configured to automatically retrieve further information associated with the identifier.

9. The portable communication device according to claim 5, wherein the portable communication device is a cellular phone.

10. A central portable communication device having computing ability and with which a local portable communication device is associated, the central portable communication device comprising:

- means for receiving, from the associated local portable communication device and in dependence of a selection made by a user of the local communication device, a request for displaying further information via a local link, wherein the request comprises a trigger,
- means for automatically retrieving the further information based on the received request, wherein the means for automatically retrieving further information comprises means for automatically retrieving further information associated with a latest sent first information,
- means for displaying the further information, and
- means for sending the first information to the local portable communication device via a local link.

11. A memory device comprising:

- computer program code to receive from a local portable communication device and in dependence of a selection made by a user of the local communication device, a request for displaying further information via a local link, wherein the request comprises a trigger,
- computer program code to automatically retrieve further information based on the received request, wherein the computer program code to automatically retrieve further information comprises computer program code to automatically retrieve further information associated with a latest sent first information,
- computer program code to display the further information at a central portable communication device that is associated with the local portable communication device, and
- computer program code to send the first information to the local portable communication device via a local link.

* * * * *